March 18, 1952 — J. E. RAINWATER — 2,589,572
METER BASE SPREADER
Filed March 8, 1948
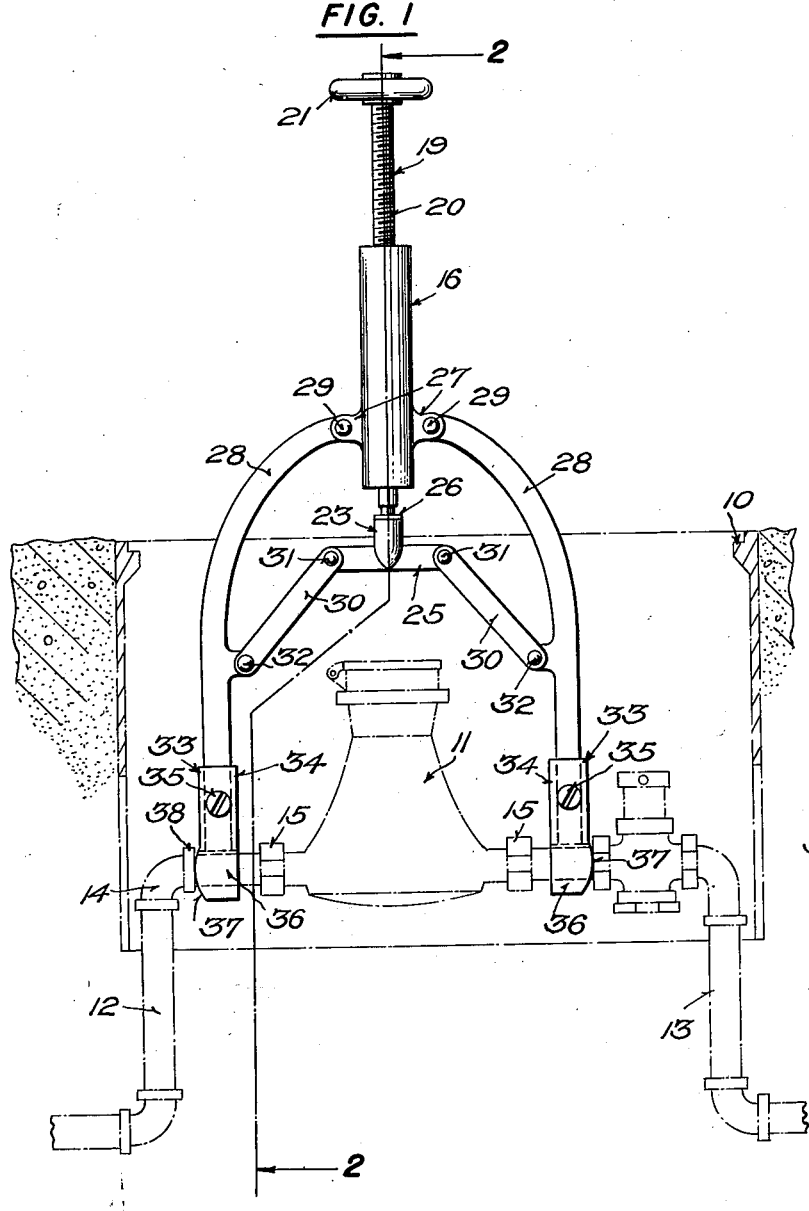
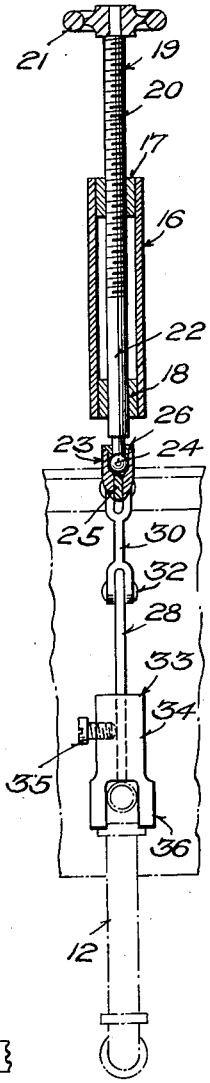
INVENTOR.
JOHN E. RAINWATER Patented Mar. 18, 1952

2,589,572

UNITED STATES PATENT OFFICE 2,589,572

METER BASE SPREADER

John Emmett Rainwater, Cedartown, Ga., assignor of one-half to Hiawatha James Hedgepeth, Cedartown, Ga.

Application March 8, 1948, Serial No. 13,714

5 Claims. (Cl. 254—126)

1

The present invention relates to devices for spreading relatively rigid opposed members from a base member normally positioned therebetween, and has particular reference to a device for spreading pipes from the base of a meter or other mechanism for registering the flow through the pipes such as a water meter.

An object of the invention is to provide a spreader device for use in the detachment and replacement of water meters in a plumbing system.

A further object is to provide a spreader device which is sturdily and economically constructed, and simple in operation.

A further object is to provide a device for moving two opposed members in opposite directions from or towards a base member normally positioned between the opposed members, for purposes of removing or installing the base member.

Yet a further object is to provide a device for separating water pipes normally attached to the base of a water meter, facilitating removal of the water meter, the device being easily adjustable to accommodate pipes of different sizes.

Other objects and advantages of the invention will be apparent from the accompanying detailed description thereof taken in connection with the drawings, wherein:

Figure 1 is a side view of the invention, shown in operating position for separating water pipes from a water meter located in a meter well; and Figure 2 is a cross-sectional view thereof taken along the line 2—2 of Figure 1.

Referring to Figure 1, the numeral 10 refers to a water meter box sunk into the ground to form a meter well of a type conventionally employed to receive and protect a water meter 11 receiving water pipes 12 and 13 forming a part of a conventional house plumbing system, for example. The usual pipe elbows 14 and connections such as coupling 15 may form a part of the pipe line, and are employed in carrying out the invention in a manner to be described.

The device of the invention includes a hollow sleeve 16 provided with an internally threaded bushing 17 at its upper end and a smooth surface bushing 18 at its lower end, receiving a shaft 19 externally threaded along a portion of its length 20 and adapted for longitudinal movement in the sleeve 16 upon rotation by a handle 21. The smooth surfaced or lower end 22 of the shaft 19 is provided with a ball and socket connection 23 having a head 24 rigidly associated with a cross bar 25, the ball being secured in the

2 socket by such means as a collar 26. This connection permits of relative movement between the shaft 19 and the cross bar 25, upon rotation of the shaft 19, and also serves to absorb shock and strain on the cross bar incident to operation of the device.

The sleeve 16 is provided with two opposed extensions 27 carrying two depending arcuate arms 28 secured thereto by pivots 29. The arms 28 are connected with the rigid cross bar 25 by linkages 30 pivotally secured at 31 and 32.

The lower or free ends of the arms 28 carry novel gripper mechanisms 33 for engagement with the opposed members to be separated from the base member. The grippers 33 include a hollow body portion 34 receiving the ends of the arms 28 in adjustable association by means of lock nuts 35 or other locking means. Each member 33 is provided with parallel depending arms 36 adapted to fit over the pipes 12 and 13, the arms 36 preferably being formed with a laterally projecting rounded bearing surface 37, adapted to provide a firm point to point contact with a collar 38 of the pipe elbow 14, or another surface projecting beyond the diameter of the pipe 12 such as the coupling nut 15, in all positions of the arms 28.

The gripper members 33 may be provided in different sizes, to accommodate pipes of different diameters.

In operation, the device is placed in the water meter well and the grippers 33 placed over the pipes 12 and 13. The handle 21 of the shaft 19 is rotated to force the linkages 30 downwardly, moving each of the arms 28 outwardly and bringing the rounded bearing surfaces 37 of the gripper members 33 into contact with suitable projecting surfaces on the pipes, such as a pipe coupling or elbow as shown, forcing the pipes in opposite directions away from the base of the water meter. The meter may easily be withdrawn from the meter well and a new meter replaced, the pipes 12 and 13 being eased gradually into proper position by counter rotation of the shaft 19.

It will be noted that if the pipes 12 and 13 fail to return to proper position upon release of outward pressures applied by the grippers 33, due for example to the pressures of earth impacted around the pipes, continued counter rotation of the shaft 19 will draw the arms 28 inwardly with positive pressure, forcing the pipes 12 and 13 together against the proper meter pipe connections for purposes of completing the installation of the new meter.

It will be noted that a firm, strong bearing construction is provided for mounting the operating shaft 19 in the sleeve 16, undue operational strain on the mechanism being taken up by the ball and socket connection between the cross bar and the operating shaft. The device may be constructed of light materials at very low per unit cost, and is readily adjustable for operation with any size water meter pipe connections.

The present invention has been described in connection with the separation of pipes from the base of a water meter or a similar device of this type for measuring the flow of gases or fluids through a pipe system. It will be apparent that the device of the invention may be employed advantageously for other purposes, wherein it is desired to separate relatively rigid members positioned on opposite sides of a base member, for purposes of removing the base member from the system. Accordingly, the invention is not to be limited save as defined in the appended claims.

I claim:

1. A device for moving two opposed members spaced by a base member to free the base member, comprising a sleeve, a pair of arms pivotally secured directly to said sleeve, a shaft in the sleeve and movable relative thereto along the longitudinal axis, linkages connecting the shaft with the arms for moving the arms in a direction normal to the axis of the shaft, upon movement of the shaft in the sleeve, and grippers on the end of each arm for grasping the said opposed members for movement.

2. A device for moving two opposed members relatively to a base member normally positioned between the opposed members, comprising a sleeve, a pair of arms pivotally secured directly to the sleeve for movement in a direction normal to the axis of the sleeve, a shaft in the sleeve movable relative thereto along the longitudinal axis, a cross bar, a connection on the base of the shaft movable relative thereto and carrying the cross bar and movable linkages connecting the cross bar to the arms and grippers on the end of each arm for grasping the said opposed members for movement.

3. A device for moving two opposed members relatively to a base member normally positioned between the opposed members, comprising a hollow sleeve, a threaded bushing in either end of the sleeve, an operating shaft having a threaded surface for engagement with the bushings for longitudinal movement upon rotation of the shaft, the sleeve extending along an appreciable length of the shaft, spacing the bushings to stiffen the shaft against bending, a pair of arms pivotally secured directly to the sleeve for movement in a direction normal to the axis of the sleeve, a ball and socket connection on the base of the shaft, a cross bar fixed to said connection, linkages connecting the cross bar to the arms, and grippers on the free ends of the arms for engagement with the two opposed members.

4. In combination with the structure set forth in claim 1, locking means for detachably securing the grippers to the free ends of the arms for engagement with the opposed members.

5. In combination with the structure set forth in claim 2, grippers comprising sleeve members insertable over the extremities of the arms, locking means for detachably securing the sleeve members relative to the arms, and protruding portions on the sleeve members forming curved bearing surfaces for engagement with the two opposed members.

JOHN EMMETT RAINWATER.

REFERENCES CITED

The following references are of record in the file of this patent:

UNITED STATES PATENTS

| Number | Name | Date |
|---|---|---|
| 1,201,445 | Decker | Oct. 17, 1916 |
| 1,207,601 | Moudy | Dec. 5, 1916 |
| 1,247,489 | Beachler | Nov. 20, 1917 |
| 1,318,344 | Anderson | Oct. 14, 1919 |
| 1,536,496 | Hill | May 5, 1925 |
| 1,597,875 | Ferrier | Aug. 31, 1926 |
| 2,139,062 | Adams | Dec. 6, 1938 |